United States Patent [19]

Hutton

[11] 4,134,326

[45] Jan. 16, 1979

[54] DEVICE FOR COMPUTING MUSICAL RELATIONSHIPS

[76] Inventor: Peter G. Hutton, 30 Darlinghurst Rd., Sydney, Australia

[21] Appl. No.: 771,971

[22] Filed: Feb. 25, 1977

[30] Foreign Application Priority Data

Feb. 25, 1976 [NZ] New Zealand ............ 180119

[51] Int. Cl.² .......................................... G09B 15/02
[52] U.S. Cl. .......................................... 84/474; 35/77
[58] Field of Search ................................ 84/470–476, 84/471 SR, 477–482; 35/77

[56] References Cited

U.S. PATENT DOCUMENTS

| 305,585 | 9/1884 | Forrest | 35/77 |
| 1,227,489 | 5/1917 | Pantillon | 84/476 |
| 1,569,328 | 1/1926 | Logan | 84/474 |
| 3,572,205 | 3/1971 | Scholfield | 84/474 |
| 3,674,905 | 7/1972 | Collins | 35/77 X |

*Primary Examiner*—John Gonzales
*Attorney, Agent, or Firm*—Holman & Stern

[57] ABSTRACT

A device which is used for computing the transposition of musical chords and comprises a number of dials each of which is rotatable about a central axis. Each dial has a display of indicia thereon which indicate the steps of a chromatic musical scale. The dials can be moved relative to each other to a plurality of positions which indicate relationships which include chord indication and transposition.

6 Claims, 3 Drawing Figures

DEVICE FOR COMPUTING MUSICAL RELATIONSHIPS

BACKGROUND OF THE INVENTION

This invention relates to a device for teaching or computing the relativity of an array of musical relationship pertaining to music theory as they relate to transposition of chords.

Such devices have been known in different forms. For example slide rule type arrangements have been proposed where an upper member slides over a lower member, the lower member having a grid pattern of indica representing notes and the upper member having a series of spaced windows or openings. By setting a datum or preselected window or opening over a key note various harmonics or chords can be read from the other windows or openings. Such devices are described for example in U.S. Pat. Nos. 375,496, 1,804,460 and 3,791,254. Because of their design these devices tend to be complex in operation and often difficult to read. In addition they mainly relate to teaching chords and the laws of harmony.

The aim of the present invention is to provide a device for teaching or computing the relativity of an array of musical relationship pertaining to music theory as they relate to transposition of chords which enables the user of the device to rapidly find any of several chords for any note or key and to indicate their relationship to each other in both the major and minor keys.

SUMMARY OF THE INVENTION

Broadly the invention consists of a device for computing the transposition of musical chords comprising a number of dials each rotatable about a central axis each dial having a display of indicia thereon which indicate the steps of a chromatic scale, the dials being movable to position relative to each other at a plurality of positions to indicate relationships which include chord indication and transposition.

MORE DETAILED DESCRIPTION OF THE PREFERRED EMBODIMENT OF THE INVENTION

Figure 1:
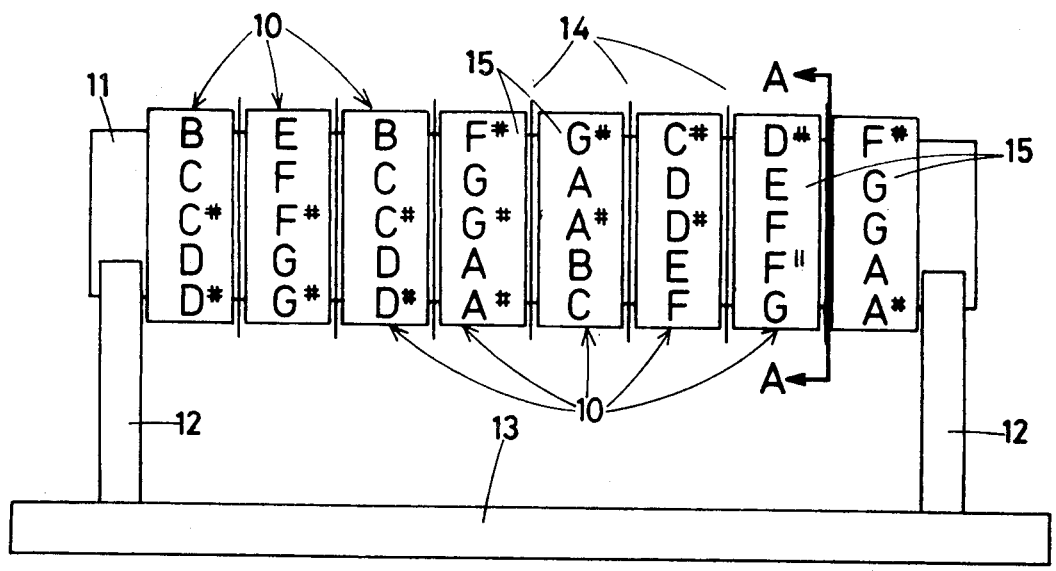
FIG. 1 is an elevational view of the device according to the invention.

In more fully describing the invention each dial consists of an annular ring 10 having a considerable thickness. Each ring 10 is placed on a central axle 11 so that said ring 10 is coaxial with the longitudinal axis of the axle 11 and can be rotated thereabout. The axle 11 is supported by a suitable support frame, brackets, legs or the like.

According to the preferred form there are eight similar rings 10 all mounted side by side along the axle 11. Preferably there are provided means to slightly spaced apart adjacent rings and to locate them on the axle. In the illustrated form these are separating discs 14 which are either fixed to or freely rotate on axle 11.

The chromatic scale is inscribed or otherwise marked on the outer peripheral surface 15 of each ring 10 as shown and if required each note can be marked in one of a series of segments indicated on the peripheral surface 15. It will be evident that twelve such segments are present on each ring.

Preferably the rings 10 are relatively stiff in operation as free moving rings make relative positioning of the rings difficult. As a form of construction the rings could move with a ratchet action on the axle and whilst this is not illustrated in the drawings is a mechanical arrangement which is well known. For example the inner peripheral surface can have teeth formed therein and which engage with a spring loaded pawl set in the axle surface.

The rings 10 and axle structure 11 can be merely mounted between two uprights 12 on a base 13 with the uprights having curved indents 16 in their upper ends to engage with the axle 11. Alternatively, the rings 10 and axle 11 can be mounted in a housing with an elongate opening of sufficient length to see all rings and a width slightly more than the arc length of a single indicia containing segment. In such an arrangement a serrated disc can be mounted coaxially with each ring and project through the housing to enable manipulation of the rings. Also in this arrangement means to lock the discs together would be necessary.

In use the musician or student for example selects the key or tonic note for a particular chord on the left hand ring. Following in order the other notes of the chord are selected on the successive rings. The complete chord thus reads across an aligned row of segments. It is then simple to transpose into another key by reading along the row aligned with the required key note on the left hand ring. With the inventioin the form having a housing locking means are necessary to ensure the rings can move as a unit so the relative positins are maintained, when for example the axle is rotated to permit viewing of a different row of notes.

Figure 2:
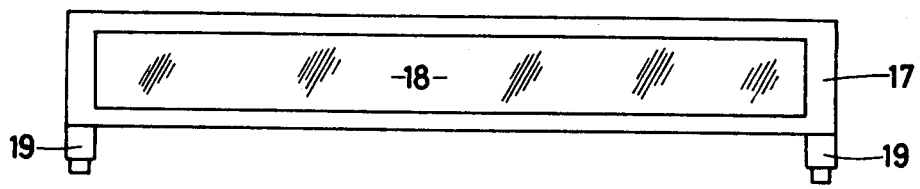
FIG. 2 is an elevational view of a viewing panel which is not shown in FIG. 1.
Figure 3:
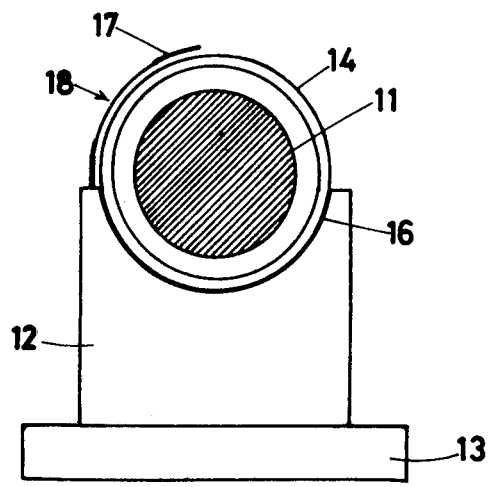
FIG. 3 is an end elevation of the device shown in FIG. 1 but with the viewing panel in place.

With the form illustrated in the drawings a viewing screen is employed. The screen (FIG. 2) consists of a rectangular panel 17 which has an elongate opening 18 formed therein. The panel is curved across its width (see FIG. 3) so that it conforms with the curvature of the rings 10. The opening 18 extends along the length of panel 17 and has a width slightly more than the arc length of a single indicia containing segment of each ring. At each end of the panel a spigot or leg 19 is provided and these engage in openings formed in the top of uprights 12. As best seen in FIG. 3 the screen thus extends over the length of the device and provides a means of isolating the particular series of notes being observed.

To those skilled in the field of music it will be evident that the device can be used for computing other musical relationships.

What is claimed is:

1. A device for computing the transposition of musical chords comprising an axle; a number of annular rings rotatably mounted on said axle, the peripheral surface of each ring having printed thereon indicia representing the successive notes of the chromatic scale: a base member with a pair of spaced apart uprights, said uprights having curved indents at the upper ends thereof in which said axle engages to be supported above said base; a plurality of separating discs, of greater diameter than said annular rings, mounted on and coaxial with said axle, there being a separating disc located between each adjacent pair of annular rings; and a viewing screen mounted on said uprights, said viewing screen being of a length to extend over all the rings and having an elongate opening through which a series of aligned indicia on adjacent rings can be viewed, sid annular rings being movable to positions relative to each other at a plurality of positions to indicate relationships which include chord indication and transposition.

2. The device as claimed in claim 1, wherein the viewing screen is detachably mounted on said uprights.

3. The device as claimed in claim 1 wherein eight annular rings are mounted on the axle.

4. The device as claimed in claim 3, wherein the annular rings are not freely rotatable but require a degree of effort.

5. The device as claimed in claim 2, wherein the viewing screen consists of a rectangular panel in which the elongate opening is formed, said panel being curved across its width said width being more than the arc length of a single indicia containing segments of each annular ring.

6. The device as claimed in claim 1 wherein each separating disc is fixedly attached to the axle.

* * * * *